(12) United States Patent
Kitagawa et al.

(10) Patent No.: US 9,343,741 B2
(45) Date of Patent: May 17, 2016

(54) ELECTRODE MATERIAL, ELECTRODE AND LITHIUM ION BATTERY

(71) Applicant: SUMITOMO OSAKA CEMENT CO., LTD., Chiyoda-ku, Tokyo (JP)

(72) Inventors: Takao Kitagawa, Tokyo (JP); Tetsuya Nakabeppu, Tokyo (JP)

(73) Assignee: SUMITOMO OSAKA CEMENT CO., LTD. (JP)

( * ) Notice: Subject to any disclaimer, the term of this patent is extended or adjusted under 35 U.S.C. 154(b) by 122 days.

(21) Appl. No.: 14/164,831

(22) Filed: Jan. 27, 2014

(65) Prior Publication Data

US 2014/0212761 A1 Jul. 31, 2014

(30) Foreign Application Priority Data

Jan. 29, 2013 (JP) ................. 2013-014645

(51) Int. Cl.
*H01M 4/36* (2006.01)
*H01M 4/38* (2006.01)
*H01M 4/02* (2006.01)
*H01M 4/583* (2010.01)
*H01M 4/58* (2010.01)
*H01M 10/0525* (2010.01)

(52) U.S. Cl.
CPC .............. *H01M 4/583* (2013.01); *H01M 4/366* (2013.01); *H01M 4/5825* (2013.01); *H01M 10/0525* (2013.01); *Y02E 60/122* (2013.01)

(58) Field of Classification Search
CPC ....... H01M 4/58; H01M 4/583; H01M 4/366; H01M 4/5825; H01M 10/0525
See application file for complete search history.

(56) References Cited

U.S. PATENT DOCUMENTS

| 2008/0116423 A1* | 5/2008 | Fan et al. .................. 252/502 |
| 2009/0305132 A1* | 12/2009 | Gauthier et al. .............. 429/207 |
| 2010/0129713 A1* | 5/2010 | Yazami et al. ............... 429/217 |
| 2010/0297502 A1* | 11/2010 | Zhu et al. .................. 429/231.8 |
| 2011/0189544 A1* | 8/2011 | Kim et al. ................. 429/231.1 |
| 2012/0141874 A1* | 6/2012 | Jang et al. .................. 429/220 |

FOREIGN PATENT DOCUMENTS

JP        A-2001-015111        1/2001

* cited by examiner

*Primary Examiner* — Kenneth Douyette
(74) *Attorney, Agent, or Firm* — Merchant & Gould P.C.

(57) ABSTRACT

An electrode material of the invention includes an agglomerate formed by agglomerating carbonaceous coated electrode active material particles obtained by forming a carbonaceous coat on surfaces of electrode active material particles at a coating rate of 80% or more, and the carbonaceous coated electrode active material particles include first carbonaceous coated electrode active material particles on which a carbonaceous coat having a film thickness in a range of 0.1 nm to 3.0 nm and an average film thickness in a range of 1.0 nm to 2.0 nm is formed and second carbonaceous coated electrode active material particles on which a carbonaceous coat having a film thickness in a range of 1.0 nm to 10.0 nm and an average film thickness in a range of more than 2.0 nm to 7.0 nm is formed.

7 Claims, No Drawings

ELECTRODE MATERIAL, ELECTRODE AND LITHIUM ION BATTERY

This application claims the benefit of priority to Japanese Patent Application No. 2013-014645 filed 29 Jan. 2013, the disclosure of which is hereby incorporated by reference in its entirety.

BACKGROUND OF THE INVENTION

1. Field of the Invention

The present invention relates to an electrode material, an electrode, and a lithium ion battery, and particularly to an electrode material that is preferably used for battery cathode materials, furthermore, lithium ion battery cathode materials, an electrode containing the above-described electrode material, and a lithium ion battery including a cathode made of the above-described electrode.

2. Description of Related Art

In recent years, as a battery expected to procure a decrease in size and weight and an increase in capacitance, non-aqueous electrolytic solution secondary batteries such as lithium ion batteries have been proposed, and have been put into practical use.

The lithium ion battery is made up of a cathode and an anode which can reversibly accept and expel lithium ions and a non-aqueous electrolyte.

Regarding anode materials of lithium ion batteries, generally, a carbon-based material or a Li-containing metallic oxide which can reversibly accept and expel lithium ions, such as lithium titanate ($Li_4Ti_5O_{12}$), is used as an anode active material.

On the other hand, regarding cathode materials of lithium ion batteries, a Li-containing metallic oxide which can reversibly accept and expel lithium ions, such as lithium iron phosphate ($LiFePO_4$) or an electrode material mixture containing a binder and the like is used as a cathode active material. In addition, a cathode of a lithium ion battery is formed by applying the electrode material mixture on a surface of a metal foil called a collector.

The lithium ion battery has a light weight, a small size and a high energy compared to secondary batteries of the related art, such as lead batteries, nickel-cadmium batteries and nickel-hydrogen batteries, and therefore the lithium ion battery is used not only in small-scale power supplies in portable electronic devices such as mobile phones and notebook personal computers but also in large-scale stationary emergency power supplies.

In addition, in recent years, studies are being made regarding the use of the lithium ion battery as high-output power supplies in plug-in hybrid vehicles, hybrid vehicles, electromotive tools and the like, and, for batteries being used in those high-output power supplies, a high-speed charge and discharge characteristic is required.

However, there is a problem in that an electrode active material, for example, an electrode material containing a lithium phosphate compound which can reversibly accept and expel lithium ions has a low electron conductivity. Therefore, in order to increase the electron conductivity of electrode materials, an electrode material is proposed in which the surfaces of particles of an electrode active material are coated with an organic compound which serves as a carbon source, and then the organic compound is carbonized, whereby a carbonaceous coat is formed on the surface of the electrode active material, and carbon in the carbonaceous coat between the surfaces of particles of an electrode active materials as an electron-conducting material (see Japanese Laid-open Patent Publication No. 2001-15111).

SUMMARY OF THE INVENTION

However, in order to use the electrode active material containing a lithium phosphate compound as a battery material for lithium ion batteries being used in high-output power supplies, it is necessary to increase the electron conductivity by forming a carbonaceous coat on the surface of the electrode active material.

However, since the carbonaceous coat hinders the diffusion of lithium ions, the conductivity of lithium ions is impaired as the film thickness of the carbonaceous coat increases and also as the crystallinity of the carbonaceous coat increases. As a result, the improvement of the electron conductivity and the improvement of the lithium ion conductivity have a trade-off relationship, and, in electrode active materials in which a larger amount of the carbonaceous coat than necessary is supported, the total internal resistance of the battery increases even in a case in which the electron conductivity has been improved, and, particularly, the voltage significantly drops when the battery is charged and discharged at a high speed.

The invention has been made in consideration of the above-described problem, and an object of the invention is to provide an electrode material which, in a case in which an electrode active material including a carbonaceous coat formed on the surface is used as an electrode material, can improve not only electron conductivity but also lithium ion conductivity by controlling the film thickness of the carbonaceous coat, an electrode, and a lithium ion battery.

As a result of comprehensive studies for solving the above-described problems, the present inventors et al. found that, when carbonaceous coated electrode active material particles obtained by forming a carbonaceous coat on surfaces of electrode active material particles at a coating rate of 80% or more are agglomerated into an agglomerate, and the carbonaceous coated electrode active material particles include first carbonaceous coated electrode active material particles on which a carbonaceous coat having a film thickness in a range of 0.1 nm to 3.0 nm and an average film thickness in a range of 1.0 nm to 2.0 nm is formed and second carbonaceous coated electrode active material particles on which a carbonaceous coat having a film thickness in a range of 1.0 nm to 10.0 nm and an average film thickness in a range of more than 2.0 nm to 7.0 nm is formed, it is possible to realize an electrode material that improves the electron conductivity without impairing the conductivity of lithium ions so as to have electron conductivity and lithium ion conductivity which satisfy a high-speed charge and discharge characteristic, and the inventors et al. completed the invention.

That is, an electrode material of the invention includes an agglomerate formed by agglomerating carbonaceous coated electrode active material particles obtained by forming a carbonaceous coat on surfaces of electrode active material particles at a coating rate of 80% or more, and the carbonaceous coated electrode active material particles include first carbonaceous coated electrode active material particles on which a carbonaceous coat having a film thickness in a range of 0.1 nm to 3.0 nm and an average film thickness in a range of 1.0 nm to 2.0 nm is formed and second carbonaceous coated electrode active material particles on which a carbonaceous coat having a film thickness in a range of 1.0 nm to 10.0 nm and an average film thickness in a range of more than 2.0 nm to 7.0 nm is formed.

It is preferable that the agglomerate include a first agglomerate formed by agglomerating the first carbonaceous coated electrode active material particles and a second agglomerate formed by agglomerating the second carbonaceous coated electrode active material particles, and the first agglomerate and the second agglomerate be mixed so that a ratio M2/(M1+M2) of a volume M2 of the second agglomerate to a total volume of a volume M1 of the first agglomerate and the volume M2 of the second agglomerate becomes in a range of 0.25 to 0.95.

The first carbonaceous coated electrode active material particle preferably includes a thin film portion having a carbonaceous coat with a film thickness in a range of 0.1 nm to 0.5 nm and a thick film portion having a carbonaceous coat with a film thickness in a range of 1.0 nm to 3.0 nm formed on a surface of the same particle.

The agglomerate is preferably formed by agglomerating in a state in which the first carbonaceous coated electrode active material particles and the second carbonaceous coated electrode active material particles are mixed so that a ratio N2/(N1+N2) of a volume N2 of the second carbonaceous coated electrode active material particles to a total volume of a volume N1 of the first carbonaceous coated electrode active material particles and the volume N2 of the second carbonaceous coated electrode active material particles becomes in a range of 0.25 to 0.95.

A mass of carbon in the carbonaceous coat is preferably in a range of 0.6% by mass to 4.0% by mass of a mass of the electrode active material particles, and a specific surface area of the electrode active material particles is preferably in a range of 5 $m^2/g$ to 20 $m^2/g$.

An electrode of the invention contains the electrode material of the invention.

A lithium ion battery of the invention includes the electrode of the invention as a cathode.

According to the electrode material of the invention, carbonaceous coated electrode active material particles obtained by forming a carbonaceous coat on surfaces of electrode active material particles at a coating rate of 80% or more are agglomerated into an agglomerate, and the carbonaceous coated electrode active material particles include first carbonaceous coated electrode active material particles on which a carbonaceous coat having a film thickness in a range of 0.1 nm to 3.0 nm and an average film thickness in a range of 1.0 nm to 2.0 nm is formed and second carbonaceous coated electrode active material particles on which a carbonaceous coat having a film thickness in a range of 1.0 nm to 10.0 nm and an average film thickness in a range of more than 2.0 nm to 7.0 nm is formed. Therefore, in particles having a thick carbonaceous coat, it is possible to increase the electron conductivity due to an increase in the amount of carbon, and, in particles having a thin carbonaceous coat, it is possible to decrease the ion transfer resistance of lithium ions due to a decrease in the diffusion distance of lithium ions in the carbonaceous film, whereby it is possible to improve the electron conductivity without impairing the conductivity of lithium ions.

According to the electrode of the invention, since the electrode contains the electrode material of the invention, it is possible to provide an electrode in which the electron conductivity is improved without impairing the conductivity of lithium ions.

According to the lithium ion battery of the invention, since the lithium ion battery includes the electrode of the invention as a cathode, it is possible to suppress the internal resistance of the battery at a low level, and thus there is no concern for the voltage significantly dropping, and it is possible to charge and discharge the battery at a high speed.

In addition, since it is possible to procure a high-speed charge and discharge characteristic without having to add fibrous conductive carbon as in the related art and to add a lamellar oxide or a spinel-type cathode material that is excellent in terms of a high-speed charge and discharge character, it is possible to apply the lithium ion battery to high-output power supplies which require high-speed charge and discharge.

DETAILED DESCRIPTION OF THE INVENTION

Embodiments for carrying out the electrode material, electrode and lithium ion battery of the invention will be described.

Meanwhile, the present embodiments are the specific description of the invention for better understanding the purpose of the invention, and, unless particularly otherwise described, the embodiments do not limit the invention.

Electrode Material

An electrode material of the embodiment includes an agglomerate formed by agglomerating carbonaceous coated electrode active material particles obtained by forming a carbonaceous coat on surfaces of electrode active material particles at a coating rate of 80% or more, and the carbonaceous coated electrode active material particles include first carbonaceous coated electrode active material particles on which a carbonaceous coat having a film thickness in a range of 0.1 nm to 3.0 nm and an average film thickness in a range of 1.0 nm to 2.0 nm is formed and second carbonaceous coated electrode active material particles on which a carbonaceous coat having a film thickness in a range of 1.0 nm to 10.0 nm and an average film thickness in a range of more than 2.0 nm to 7.0 nm is formed.

Here, the agglomerate being formed by agglomerating carbonaceous coated electrode active material particles means that the carbonaceous coated electrode active material particles form an agglomerate in a state in which the carbonaceous coated electrode active material particles are in contact with each other. The state in which the carbonaceous coated electrode active material particles are in contact with each other is not particularly limited, but is preferably an agglomerate in which the particles have a small contact area and a neck-like shape with a small cross-sectional area at the contact portion so as to be strongly connected with each other. When the contact portion between the electrode active material particles of the carbonaceous coated electrode active material particles forms a neck-like shape with a small cross-sectional area, the agglomerate has a structure in which voids spread three-dimensionally into a channel (net) shape.

In addition, when the carbonaceous coated electrode active material particles are used as an electrode material for lithium ion batteries, since a reaction concerning the accept and expel of lithium ions uniformly occurs throughout the entire surfaces of the electrode active material particles, 80% or more and preferably 90% or more of the surfaces of the electrode active material particles are preferably coated with the carbonaceous coat.

The coating rate of the carbonaceous coat can be measured using a transmission electron microscope (TEM) or an energy dispersive X-ray spectrometer (EDX). Here, when the coating rate of the carbonaceous coat is less than 80%, the coating effect of the carbonaceous coat becomes insufficient, and, when the lithium ion accept and expel reaction occurs on the surfaces of the electrode active material, the reaction resistance concerning the accept and expel of lithium ions becomes large at places in which the carbonaceous coat is not formed, and the voltage drop at the final phase of discharge becomes significant, which is not preferable.

The reason for limiting the film thickness of the first carbonaceous coated electrode active material particle in a range of 0.1 nm to 3.0 nm is that, when the film thickness is less than 0.1 nm, the effect of the carbonaceous coat that supplies electron conductivity is lost, and, on the other hand, when the film thickness exceeds 3.0 nm, it becomes difficult to suppress the average film thickness at 2.0 nm or less.

The reason for limiting the average film thickness of the first carbonaceous coated electrode active material particle to a range of 1.0 nm to 2.0 nm is that, when the average film thickness is within the above-described range, carbonaceous coated electrode active material particles having excellent ion conductivity can be obtained.

The first carbonaceous coated electrode active material particle preferably includes a thin film portion having a carbonaceous coat with a film thickness in a range of 0.1 nm to 0.5 nm and a thick film portion having a carbonaceous coat with a film thickness in a range of 1.0 nm to 3.0 nm formed on a surface of the same particle.

Here, the reason for limiting the film thickness of the thin film portion in a range of 0.1 nm to 0.5 nm and limiting the film thickness of the thick film portion to a range of 1.0 nm to 3.0 nm is that, when the thin film portion and the thick film portion having the above-described thickness are formed on the surface of the same particle, carbonaceous coated electrode active material particles having superior ion conductivity can be obtained.

The reason for limiting the film thickness of the second carbonaceous coated electrode active material particle to a range of 1.0 nm to 10.0 nm is that, when the film thickness is less than 1.0 nm, it becomes difficult to maintain the average film thickness at a film thickness exceeding 2.0 nm, and, on the other hand, when the film thickness exceeds 10.0 nm, it becomes difficult to suppress the average film thickness at 7.0 nm or less.

The reason for limiting the average film thickness of the second carbonaceous coated electrode active material particle to a range of more than 2.0 nm to 7.0 nm is that, when the average film thickness is 2.0 nm or less, the total transfer resistance of electrons in the carbonaceous coat becomes large, thus, the internal resistance of the battery increases, and the voltage drop becomes significant at a high-speed charge and discharge rate; on the other hand, when the average film thickness exceeds 7.0 nm, the transfer resistance of lithium ions becomes large due to the steric hindrance caused when lithium ions diffuse in the carbonaceous coat, thus, the internal resistance of the battery increases, and the voltage drop becomes significant at a high-speed charge and discharge rate.

The "internal resistance" stated herein refers to the sum of, mainly, the transfer resistance of electrons and the transfer resistance of lithium ions, the transfer resistance of electrons is proportional to the film thickness of the carbonaceous coat, the density and the crystallinity of the carbonaceous coat, and the transfer resistance of lithium ions is inversely proportional to the film thickness of the carbonaceous coat, the density and the crystallinity of the carbonaceous coat.

As a method for evaluating the internal resistance, for example, a current-resist method or the like is used. In the current-resist method, all of interconnection resistance, contact resistance, the transfer resistance of electrons, the transfer resistance of lithium ions, lithium reaction resistance in a cathode and an anode, interelectrode resistance determined by the interelectrode distance between the cathode and the anode, resistance concerning accept and expel lithium ions, and the solid electrolyte interface (SEI) transfer resistance of lithium ions are measured as the internal resistance.

The agglomerate preferably includes a first agglomerate formed by agglomerating the first carbonaceous coated electrode active material particles and a second agglomerate formed by agglomerating the second carbonaceous coated electrode active material particles.

In this case, the first agglomerate and the second agglomerate are preferably mixed so that a ratio $M2/(M1+M2)$ of a volume M2 of the second agglomerate to a total volume of a volume M1 of the first agglomerate and the volume M2 of the second agglomerate falls in a range of 0.25 to 0.95.

Here, the reason for setting the ratio $M2/(M1+M2)$ in a range of 0.25 to 0.95 is that, when the ratio $M2/(M1+M2)$ is less than 0.25, the volume fraction of the volume M2 of the second agglomerate becomes the critical infiltration volume fraction or less in the mess disposition based on the percolation theory, infinitely percolated paths are not formed in the above-described agglomerate, therefore, regions that impair conductivity are formed in the agglomerate, thus, in a case in which the agglomerate is used for a battery, the internal resistance of the battery increases, and the voltage drop becomes significant at a high-speed charge and discharge rate.

On the other hand, when the ratio $M2/(M1+M2)$ exceeds 0.95, the volume fraction of the second agglomerate becomes too large, and ion conductivity decreases.

The agglomerate may be formed by agglomerating in a state in which the first carbonaceous coated electrode active material particles and the second carbonaceous coated electrode active material particles are mixed.

In this case, the agglomerate is preferably formed by agglomerating in a state in which the first carbonaceous coated electrode active material particles and the second carbonaceous coated electrode active material particles are mixed so that a ratio $N2/(N1+N2)$ of a volume N2 of the second carbonaceous coated electrode active material particles to a total volume of a volume N1 of the first carbonaceous coated electrode active material particles and the volume N2 of the second carbonaceous coated electrode active material particles becomes in a range of 0.25 to 0.95.

Here, the reason for setting the ratio $N2/(N1+N2)$ in a range of 0.25 to 0.95 is that, when the ratio $N2/(N1+N2)$ is less than 0.25, the volume fraction of the volume N2 of the second carbonaceous coated electrode active material particles becomes the critical infiltration volume fraction or less in the mess disposition based on percolation theory, infinitely percolated paths are not formed in the above-described agglomerate, therefore, regions that impair conductivity are formed in the agglomerate, thus, in a case in which the agglomerate is used for a battery, the internal resistance of the battery increases, and the voltage drop becomes significant at a high-speed charge and discharge rate.

On the other hand, when the ratio $N2/(N1+N2)$ exceeds 0.95, the volume fraction of the second carbonaceous coated electrode active material particles becomes too large, and ion conductivity decreases.

In the carbonaceous coated electrode active material particles, that is, the first carbonaceous coated electrode active material particles and the second carbonaceous coated electrode active material particles, the mass of carbon in the carbonaceous coat is preferably in a range of 0.6% by mass to 4.0% by mass, and more preferably in a range of 1.1% by mass to 1.7% by mass of the mass of the electrode active material particles.

Here, the reason for setting the mass of carbon in the carbonaceous coat to a range of 0.6% by mass to 4.0% by mass is that, when the mass of carbon in the carbonaceous coat is less than 0.6% by mass in the first and second carbonaceous coated electrode active material particles, in a case in which the ratio M2/(M1+M2) is set to 0.25, the film thickness of the carbonaceous coat being formed on the second carbonaceous coated electrode active material particle fails to reach 2.0 nm when the specific area of the electrode active material particles is 20 m$^2$/g, and, on the other hand, when the mass of carbon in the carbonaceous coat exceeds 4.0% by mass, in a case in which the ratio M2/(M1+M2) is set to 0.25, the film thickness of the carbonaceous coat being formed on the second carbonaceous coated electrode active material particle exceeds 7.0 nm when the specific area of the electrode active material particles is 5 m$^2$/g, the transfer resistance of lithium ions becomes large due to the steric hindrance caused when lithium ions diffuse in the carbonaceous coat, thus, the internal resistance of the battery increases, and the voltage drop becomes significant at a high-speed charge and discharge rate.

The volume density of the agglomerate is preferably in a range of 50% by volume to 80% by volume, more preferably in a range of 55% by volume to 75% by volume, and still more preferably in a range of 60% by volume to 75% by volume of the volume density of the solid agglomerate.

Here, the solid agglomerate refers to a void-free agglomerate, and the density of the solid agglomerate is equal to the theoretical density of the electrode active material.

The volume density can be measured using a mercury porosimeter, and is calculated from the total mass of an electrode material including the agglomerate and the volume of gaps between particles that configure the agglomerate.

When the volume density of the agglomerate is set in a range of 50% by volume to 80% by volume as described above, the agglomerate is made to be dense in a state in which a certain amount of pores (voids) are present so that the strength of the entire agglomerate increases, for example, when the electrode active material is mixed with a binder, a conduction promoter and a solvent, thereby preparing an electrode slurry, the agglomerate does not easily break, thus, an increase in the viscosity of the electrode slurry is suppressed, and the fluidity is maintained, whereby the coatability becomes favorable, and it is possible to improve the filling ability of the electrode active material in a coat of the electrode slurry.

The electrode active material that configures the electrode active material particles preferably contains one selected from a group of lithium cobaltate, lithium nickelate, lithium manganese oxide (LiMn$_2$O$_4$), lithium titanate and Li$_x$A$_y$D$_z$PO$_4$ (here, A represents at least one selected from a group consisting of Co, Mn, Ni, Fe, Cu and Cr; D represents at least one selected from a group consisting of Mg, Ca, S, Sr, Ba, Ti, Zn, B, Al, Ga, In, Si, Ge, Sc, Y and rare earth elements, $0<x<2$, $0<y<1.5$, and $0\leq z<1.5$) as a principal component.

Here, A is preferably Co, Mn, Ni or Fe, and D is preferably Mg, Ca, Sr, Ba, Ti, Zn or Al since a high discharge potential can be obtained.

Here, the rare earth element refers to 15 elements which are La, Ce, Pr, Nd, Pm, Sm, Eu, Gd, Tb, Dy, Ho, Er, Tm, Yb and Lu which belongs to lanthanum series.

In the carbonaceous coated electrode active material particles, that is, the first carbonaceous coated electrode active material particles and the second carbonaceous coated electrode active material particles, the specific surface area of the electrode active material particles is preferably in a range of 5 m$^2$/g to 20 m$^2$/g, and more preferably in a range of 9 m$^2$/g to 13 m$^2$/g.

Here, the reason for limiting the specific surface area of the electrode active material particles in the above-described range is that, when the specific surface area is less than 5 m$^2$/g, in a case in which the amount of carbon in the carbonaceous coat is 4.0% by mass, the average film thickness of the carbonaceous coat exceeds 7.0 nm which is the upper limit of the average film thickness of the second carbonaceous coated electrode active material, and, on the other hand, when the specific surface area exceeds 20 m$^2$/g, in a case in which the amount of carbon in the carbonaceous coat is less than 0.6% by mass, the average film thickness of the carbonaceous coat fails to reach 1.0 nm which is the lower limit of the average film thickness of the second carbonaceous coated electrode active material.

In a case in which the electrode material is evaluated, a 2032 coin-type cell having an electrode film thickness of 60 μm is used, and a method in which the internal resistance of the electrode material is measured using the current-resist method is used. The internal resistance obtained in the above manner is preferably 20Ω or less.

Here, the reason for limiting the internal resistance to 20Ω or less is that, when the internal resistance exceeds 20Ω, it becomes necessary to reduce the internal resistance as a battery by decreasing the electrode film thickness such that the battery capacity per electrode decreases, and, consequently, it becomes necessary to increase the number of electrodes to realize a desired battery capacity in the battery.

When the number of electrodes is increased, the number of electrode members such as a current collector having no battery activity and a separator increases in accordance with the number of electrodes, and thus the battery capacity decreases, which is not preferable.

Method for Manufacturing the Electrode Material

In a method for manufacturing the electrode material of the embodiment, a slurry which contains electrode active material particles or a precursor thereof, an organic compound and water, and has a ratio (D90/D10) of a particle diameter (D90) when the cumulative volume percentage in the grain size distribution of the electrode active material particles or the precursor thereof is 90% to a particle diameter (D10) when the cumulative volume percentage is 10% in a range of 5 to 30 is dried, and then the obtained dried substance is fired at a temperature in a range of 500° C. to 1000° C. in a non-oxidizing atmosphere, thereby respectively obtaining the first carbonaceous coated electrode active material particles on which a carbonaceous coat having a film thickness in a range of 0.1 nm to 3.0 nm and an average film thickness in a range of 1.0 nm to 2.0 nm is formed and the second carbonaceous coated electrode active material particles on which a carbonaceous coat having a film thickness in a range of 1.0 nm to 10.0 nm and an average film thickness in a range of 2.0 nm to 7.0 nm is formed, or obtaining a mixture of the first carbonaceous coated electrode active material particles and the second carbonaceous coated electrode active material particles.

Similarly to what has been described regarding the electrode material, the electrode active material that configures the electrode active material particles preferably contains one selected from a group of lithium cobaltate, lithium nickelate, lithium manganese oxide (LiMn$_2$O$_4$), lithium titanate and Li$_x$A$_y$D$_z$PO$_4$ (here, A represents at least one selected from a group consisting of Co, Mn, Ni, Fe, Cu and Cr; D represents at least one selected from a group consisting of Mg, Ca, S, Sr, Ba, Ti, Zn, B, Al, Ga, In, Si, Ge, Sc, Y and rare earth elements, $0<x<2$, $0<y<1.5$, and $0\leq z<1.5$) as a principal component.

Here, A is preferably Co, Mn, Ni or Fe, and D is preferably Mg, Ca, Sr, Ba, Ti, Zn or Al since a high discharge potential can be obtained.

Here, the rare earth element refers to 15 elements which are La, Ce, Pr, Nd, Pm, Sm, Eu, Gd, Tb, Dy, Ho, Er, Tm, Yb and Lu which belong to lanthanum series.

As the compound ($Li_xA_yD_zPO_4$ powder) represented by $Li_xA_yD_zPO_4$, it is possible to use a compound manufactured using a method of the related art such as a solid phase method, a liquid phase method or a gas phase method.

As the compound ($Li_xA_yD_zPO_4$ powder), it is possible to preferably use a compound ($Li_xA_yD_zPO_4$ powder) obtained by, for example, hydrothermally synthesizing a slurry-form mixture obtained by mixing a lithium source selected from a lithium salt such as lithium acetate ($LiCH_3COO$) and lithium chloride (LiCl) and lithium hydroxide (LiOH), a divalent iron salt such as iron (II) chloride ($FeCl_2$), iron (II) acetate ($Fe(CH_3COO)_2$) and iron (II) sulfate ($FeSO_4$), a phosphate compound such as phosphoric acid ($H_3PO_4$), ammonium dihydrogen phosphate ($NH_4H_2PO_4$) and diammonium hydrogen phosphate (($NH_4)_2HPO_4$), and water using a pressure-resistant closed container; washing the obtained settlement using water so as to generate a cake-form precursor substance, and firing the cake-form precursor substance.

The $Li_xA_yD_zPO_4$ powder may be crystalline particles, amorphous particles, or mixed crystal particles containing both crystalline particles and amorphous particles. Here, the reason why the $Li_xA_yD_zPO_4$ powder may be amorphous particles is that, when thermally treated at a temperature in a range of 500° C. to 1000° C. in a non-oxidizing atmosphere, the amorphous particles crystallize.

The size of the electrode active material particle is not particularly limited, but the average grain diameter of primary particles is preferably in a range of 0.01 μm to 20 μm, and more preferably in a range of 0.02 μm to 5 μm.

Here, the reason for limiting the average grain diameter of the primary particles of the electrode active material particles in the above-described range is that, when the average grain diameter of the primary particles is less than 0.01 μm, it becomes difficult to sufficiently coat the surfaces of the primary particles with a carbon thin film, the discharge capacitance becomes low at a high-speed charge and discharge rate, and it becomes difficult to realize a sufficient charge and discharge rate performance, which is not preferable, and, on the other hand, when the average grain diameter of the primary particles exceeds 20 μm, the internal resistance of the primary particles becomes large, and therefore the discharge capacitance becomes insufficient at a high-speed charge and discharge rate, which is not preferable.

The shape of the electrode active material particle is not particularly limited; however, since a spherical agglomerate, and particularly, a truly spherical agglomerate is easily generated, the shape of the electrode active material particle is also preferably spherical, and particularly preferably truly spherical.

Here, the reason why the shape of the electrode active material particle is preferably spherical is that, when cathode paste is prepared by mixing the electrode active material particles, a binder resin (binder) and a solvent, it is possible to reduce the amount of the solvent and it becomes easy to apply the cathode paste to collectors.

In addition, when the shape of the electrode active material particle is spherical, the surface area of the electrode active material particles becomes the minimum, it is possible to minimize the blending amount of the binder resin (binder) being added to the electrode material mixture and to decrease the internal resistance of cathodes being obtained, which is preferable.

Furthermore, since it is easy to closely pack the electrode active material particles, the amount of the cathode material packed per unit volume increases so that it is possible to increase the electrode density, and thus it is possible to increase the capacitance of lithium ion batteries, which is preferable.

In addition, the organic compound is not particularly limited as long as the organic compound can form a carbonaceous coat on the surfaces of the electrode active material particles. Examples thereof include polyvinyl alcohol, polyvinyl pyrrolidone, cellulose, starch, gelatin, carboxymethyl cellulose, methyl cellulose, hydroxymethyl cellulose, hydroxylethyl cellulose, polyacrylic acid, polystyrene sulfonate, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyethers, divalent alcohols, trivalent alcohols and the like.

The blending ratio of the organic compound to the electrode active material is, when the total amount of the organic compound is converted to the amount of carbon, preferably in a range of 0.6 parts by mass to 4.0 parts by mass, and more preferably in a range of 1.1 parts by mass to 1.7 parts by mass with respect to 100 parts by mass of the electrode active material.

Here, when the blending ratio of the organic compound in terms of the amount of carbon is less than 0.6 parts by mass, in a case in which a battery has been formed, the discharge capacitance becomes low at a high-speed charge and discharge rate, and it becomes difficult to realize a sufficient charge and discharge rate performance. On the other hand, when the blending ratio of the organic compound in terms of the amount of carbon exceeds 4.0 parts by mass, the transfer resistance of lithium ions becomes large due to the steric hindrance caused when lithium ions diffuse in the carbonaceous coat, thus, in a case in which a battery is formed, the internal resistance of the battery increases, and it becomes impossible to ignore the voltage drop at a high-speed charge and discharge rate.

The electrode active material particles and the organic compound are dissolved or dispersed in water, thereby preparing a homogeneous slurry. When dissolving or dispersing the electrode active material particles and the organic compound, it is preferable to add a dispersant.

A method for dissolving or dispersing the electrode active material particles and the organic compound in water is not particularly limited as long as the electrode active material particles are dispersed and the organic compound is dissolved or dispersed, and, for example, a dispersing apparatus such as a planetary ball mill, a vibrational ball mill, a beads mill, a paint shaker or an attritor is preferably used.

When dissolving or dispersing the electrode active material particles and the organic compound, it is preferable that, first, the electrode active material particles be dispersed in a form of primary particles, then, the organic compound be added and stirred so as to be dissolved. Then, the surfaces of the electrode active material particles are coated with the organic compound, and thus carbon derived from the organic compound is uniformly interposed between the electrode active material particles.

When adjusting the slurry, the dispersion conditions of the slurry, for example, the concentrations of the electrode active material and the organic compound in the slurry, the stirring time, and the like are appropriately adjusted so that the ratio (D90/D10) of the electrode active material or a precursor thereof is set in a range of 5 to 30. Then, it is possible to set the volume density of the obtained agglomerate in a range of 50% by volume to 80% by volume of the volume density of the solid agglomerate.

Next, the slurry is sprayed and dried in a high-temperature atmosphere, for example, at a temperature in a range of 70° C. to 250° C. in the atmosphere.

Next, the dried substance is fired in a non-oxidizing atmosphere at a temperature in a range of 500° C. to 1000° C., and preferably in a range of 600° C. to 900° C. for 0.1 hours to 40 hours.

The non-oxidizing atmosphere is preferably an inert atmosphere such as nitrogen ($N_2$) or argon (Ar), and, in a case in which it is necessary to further suppress oxidation, a reducing atmosphere containing approximately several percent by volume of a reducing gas such as hydrogen ($H_2$) is preferable. In addition, for the purpose of removing organic components evaporated in the non-oxidizing atmosphere during the firing, a combustion-supporting or flammable gas such as oxygen ($O_2$) may be introduced into the inert atmosphere.

Here, the reason for setting the firing temperature in a range of 500° C. to 1000° C. is that, when the firing temperature is lower than 500° C., since the decomposition reaction of the organic compound included in the dried substance does not sufficiently progress, the organic compound is not sufficiently carbonized, and thus highly resistant decomposed substances of the organic compound are generated in the obtained agglomerate, which is not preferable, and, on the other hand, when the firing temperature exceeds 1000° C., Li in the electrode active material is evaporated such that not only is the composition of the electrode active material deviated, but grain growth is also promoted in the electrode active material, thus, the discharge capacitance at a high-speed charge and discharge rate becomes low, and it becomes difficult to realize a sufficient charge and discharge rate performance, which is not preferable.

As described above, the surfaces of the electrode active material are coated with carbon generated due to the thermal decomposition of the organic compound in the dried substance, and therefore an agglomerate having carbon interposed between the electrode active material particles is obtained.

Electrode

An electrode of the embodiment contains the electrode material of the embodiment.

In order to produce the electrode of the embodiment, the electrode material, a binder containing a binder resin, and a solvent are mixed, thereby preparing a coating for forming electrodes or paste for forming electrodes. At this time, a conduction promoter such as carbon black may be added as necessary.

Examples of the binder, that is, the binder resin that can be preferably used include polytetrafluoroethylene (PTFE) resins, polyvinylidene fluoride (PVdF) resins and fluorine-containing rubber.

The blending ratio of the binder resin to the electrode material is not particularly limited; however, for example, 1 part by mass to 30 parts by mass, preferably, 3 parts by mass to 20 parts by mass of the binder resin is blended with 100 parts by mass of the electrode material.

The solvent being used in the coating for forming electrodes or the paste for forming electrodes is appropriately selected in accordance with the properties of the binder resin, and examples thereof include water; alcohols such as methanol, ethanol, 1-propanol, 2-propanol (isopropyl alcohol: IPA), butanol, pentanol, hexanol, octanol and diacetone alcohol; esters such as ethyl acetate, butyl acetate, ethyl lactate, propylene glycol monomethyl ether acetate, propylene glycol monoethyl ether acetate and γ-butyrolactone; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether and diethylene glycol monoethyl ether; ketones such as acetone, methyl ethyl ketone (MEK), methyl isobutyl ketone (MIBK), acetyl acetone and cyclohexanone; amides such as dimethyl formamide, N,N-dimethyl acetoacetamide and N-methylpyrrolidone; and glycols such as ethylene glycol, diethylene glycol and propylene glycol. The solvent may be solely used, or a mixture of two or more solvents may be used.

Next, the coating for forming electrodes or the paste for forming electrodes is applied to a surface of a metal foil, and then dried, thereby obtaining a metal foil having a coat made of a mixture of the electrode material and the binder resin formed on a surface.

Next, the coat is pressurized, pressed and dried, thereby producing a collector (electrode) including an electrode material layer on a surface of the metal foil.

Then, it is possible to produce the electrode of the embodiment which can improve the electron conductivity without impairing the lithium ion conductivity.

Lithium Ion Battery

A lithium ion battery of the embodiment includes the electrode of the embodiment as a cathode.

In the lithium ion battery, when an electrode is produced using the electrode material of the embodiment, it is possible to decrease the internal resistance of the electrode. Therefore, it is possible to suppress the internal resistance of the battery at a low level, and thus it is possible to provide a lithium ion battery which can be charged and discharged at a high speed with no concern of significant voltage drop.

In the lithium ion battery of the embodiment, an anode, an electrolytic solution, a separator and the like are not particularly limited. For example, an anode material such as metallic Li, a carbon material, a Li alloy or $Li_4Ti_5O_{12}$ can be used as the anode. In addition, a solid electrolyte may be used instead of the electrolytic solution and the separator.

As described above, according to the electrode material of the embodiment, since the carbonaceous coated electrode active material particles obtained by forming the carbonaceous coat on the surfaces of the electrode active material particles at a coating rate of 80% or more are agglomerated into an agglomerate, and the carbonaceous coated electrode active material particles include the first carbonaceous coated electrode active material particles on which a carbonaceous coat having a film thickness in a range of 0.1 nm to 3.0 nm and an average film thickness in a range of 1.0 nm to 2.0 nm is formed and the second carbonaceous coated electrode active material particles on which a carbonaceous coat having a film thickness in a range of 1.0 nm to 10.0 nm and an average film thickness in a range of more than 2.0 nm to 7.0 nm is formed, in particles having a thick carbonaceous coat, it is possible to increase the electron conductivity due to an increase in the amount of carbon, and, in particles having a thin carbonaceous coat, it is possible to decrease the ion transfer resistance of lithium ions due to a decrease in the diffusion distance of lithium ions in the carbonaceous film, whereby it is possible to improve the electron conductivity without impairing the conductivity of lithium ions.

Furthermore, it is possible to decrease the internal resistance of the electrode material by controlling the support amount of carbon, the film thickness of the carbonaceous coat, the density of the carbonaceous coat, the specific surface area of the electrode active material particles, and the mass percent of the carbon components that configure the carbonaceous coat.

According to the electrode of the embodiment, since the electrode contains the electrode material of the invention, it is possible to provide an electrode in which the electron conductivity is improved without impairing the conductivity of lithium ions.

According to the lithium ion battery of the embodiment, since the lithium ion battery includes the cathode which is the electrode of the embodiment, it is possible to suppress the internal resistance of the battery at a low level, and thus there is no concern that the voltage may significantly drop, and it is possible to charge and discharge the battery at a high speed.

In addition, since it is possible to procure a high-speed charge and discharge characteristic without having to add fibrous conductive carbon as in the related art and to add a lamellar oxide or a spinel-type cathode material that is excellent in terms of a high-speed charge and discharge character, it is possible to apply the lithium ion battery to high-output power supplies which require high-speed charge and discharge.

Furthermore, in a case in which the electrode material is used in the lithium ion battery, it is possible to decrease the internal resistance of the battery by controlling the support amount of carbon, the film thickness of the carbonaceous coat, the density of the carbonaceous coat, the specific surface area of the electrode active material particles, and the mass percent of the carbon components that configure the carbonaceous coat, and it is possible to use the lithium ion battery as a high-output power supplies.

EXAMPLES

Hereinafter, the invention will be specifically described using Examples 1 to 25 and Comparative Examples 1 to 8, but the invention is not limited to the examples.

For example, in the present example, metallic Li is used as an anode to reflect the behaviors of the electrode material in data, but an anode material such as a carbon material, a Li alloy or $Li_4Ti_5O_{12}$ may be used. In addition, a solid electrolyte may be used instead of the electrolytic solution and the separator.

Example 1

Production of an Electrode Material

Lithium acetate ($LiCH_3COO$, 4 mol), iron (II) sulfate ($FeSO_4$, 2 mol) and phosphoric acid ($H_3PO_4$, 2 mol) were mixed with water (2 L) so that the total amount became 4 L, thereby preparing a homogeneous slurry-form mixture.

Next, the mixture was accommodated in a pressure-resistant closed container having a capacity of 8 L, and was hydrothermally synthesized at 200° C. for 1 hour.

Next, the obtained segment was washed using water, thereby obtaining a cake-form precursor of electrode active material particles.

Next, the precursor of the electrode active material particles (150 g in terms of the solid solution) and, as an organic compound, an aqueous solution of polyvinyl alcohol obtained by dissolving polyvinyl alcohol (PVA, 2.0 g) in water (100 g) were mixed so as to produce a slurry, and a dispersion treatment was carried out on the slurry using a two-fluid wet jet crusher so that D50 became 140 nm in the grain size distribution of the precursor of the electrode active material particles in the slurry.

Next, the slurry that had been subjected to the dispersion treatment was sprayed in the atmosphere at 180° C. and was dried, thereby obtaining a dried substance having an average particle diameter of 6 μm.

Next, the obtained dried substance was fired at 700° C. in a nitrogen atmosphere for 1 hour, thereby obtaining an agglomerate A1 which was formed by agglomerating first carbonaceous coated electrode active material particles and had an average particle diameter of 6 μm.

Meanwhile, the precursor of the electrode active material particles (150 g in terms of the solid solution) and, as an organic compound, an aqueous solution of polyvinyl alcohol obtained by dissolving polyvinyl alcohol (PVA, 7.1 g) in water (100 g) were mixed so as to produce a slurry, and a dispersion treatment was carried out on the slurry using a two-fluid wet jet crusher so that D50 became 140 nm in the grain size distribution of the precursor of the electrode active material particles in the slurry.

Next, the slurry that had been subjected to the dispersion treatment was sprayed in the atmosphere at 180° C. and was dried, thereby obtaining a dried substance having an average particle diameter of 6 μm.

Next, the obtained dried substance was fired at 700° C. in a nitrogen atmosphere for 1 hour, thereby obtaining an agglomerate A2 which was formed by agglomerating second carbonaceous coated electrode active material particles and had an average particle diameter of 6 μm.

Next, the agglomerate A1 and the agglomerate A2 were mixed so that the ratio M2/(M1+M2) of the volume M2 of the agglomerate A2 to the total volume of the volume M1 of the agglomerate A1 and the volume M12 of the agglomerate A2 became 0.25, thereby obtaining an electrode material of Example 1 containing the agglomerate A1 and the agglomerate A2 mixed therein.

Evaluation of the Electrode Material

The specific surface area of the electrode active material (the mixture of the agglomerate A1 and the agglomerate A2) for the electrode material, the amount of carbon, the coating rate of the carbonaceous coat, the film thickness (average value) of the carbonaceous coat on the first carbonaceous coated electrode active material particles that configured the agglomerate A1, and the film thickness (average value) of the carbonaceous coat on the second carbonaceous coated electrode active material particles that configured the agglomerate A2 were respectively evaluated.

The evaluation methods were as described below.

(1) Specific Surface Area

The specific surface area of the electrode active material was measured using a specific surface area meter.

(2) The Amount of Carbon

The amount of carbon in the electrode active material was measured using a carbon analyzer.

(3) The Coating Rate of the Carbonaceous Coat

The carbonaceous coat on the agglomerate that configured the electrode active material was observed using a transmission electron microscope (TEM) and an energy dispersive X-ray spectrometer (EDX), the fraction of carbonaceous coat-coated portions in the surface of the agglomerate was calculated, and considered as the coating rate.

(4) The Film Thickness of the Carbonaceous Coat

The carbonaceous coats on the respective surfaces of the first carbonaceous coated electrode active material particles that configured the agglomerate A1 and the second carbonaceous coated electrode active material particles that configured the agglomerate A2 were observed using a transmission electron microscope (TEM), and the average value of the film thicknesses of the respective carbonaceous coats was calculated based on the transmission electron microscopic (TEM) images.

The evaluation results are described in Table 1.

Production of a Lithium Ion Battery

The electrode material, polyvinylidene fluoride (PVdF) as a binder, and acetylene black (AB) as a conduction promoter were mixed so that the mass ratio became 90:5:5, and, furthermore, N-methyl-2-pyrrolidinone (NMP) was added as a solvent so as to supply fluidity, thereby producing a slurry.

Next, the slurry was applied onto a 15 μm-thick aluminum (Al) foil, and was dried. After that, the slurry was pressed with a pressure of 600 kgf/cm$^2$, thereby producing a cathode for a lithium ion battery of Example 1.

Lithium metal was disposed as an anode with respect to the cathode of the lithium ion battery, and a separator made of porous polypropylene was disposed between the cathode and the anode, thereby producing a battery member.

Meanwhile, ethylene carbonate and diethyl carbonate were mixed at 1:1 (mass ratio), and, furthermore, a LiPF$_6$ solution (1 M) was added, thereby producing an electrolytic solution having lithium ion conductivity.

Next, the battery member was immersed in the electrolytic solution, thereby producing the lithium ion battery of Example 1.

Evaluation of the Lithium Ion Battery

The internal resistance of the lithium ion battery was evaluated. The evaluation method was as described below.

The cathode having an electrode area of two square centimeters and an electrode density of 2.0 g/cc and the anode made of lithium metal were placed opposite to each other through a 25-micron separator made of porous polypropylene, disposed in a coin cell container having a diameter of 2 cm and a thickness of 3.2 mm, and the internal resistance was calculated from the voltage rise measured using the current-resist method during 1 C discharge with a depth of discharge of 50% and the 1C discharge current. The internal resistance is described in Table 1.

Example 2

An electrode material and a lithium ion battery of Example 2 were produced in the same manner as in Example 1 except for the fact that the agglomerate A1 and the agglomerate A2 were mixed so that the ratio M2/(M1+M2) became 0.40, and were evaluated. The evaluation results are described in Table 1.

Example 3

An electrode material and a lithium ion battery of Example 3 were produced in the same manner as in Example 1 except for the fact that the agglomerate A1 and the agglomerate A2 were mixed so that the ratio M2/(M1+M2) became 0.55, and were evaluated. The evaluation results are described in Table 1.

Example 4

An electrode material and a lithium ion battery of Example 4 were produced in the same manner as in Example 1 except for the fact that the agglomerate A1 and the agglomerate A2 were mixed so that the ratio M2/(M1+M2) became 0.75, and were evaluated. The evaluation results are described in Table 1.

Example 5

An electrode material and a lithium ion battery of Example 5 were produced in the same manner as in Example 1 except for the fact that the agglomerate A1 and the agglomerate A2 were mixed so that the ratio M2/(M1+M2) became 0.95, and were evaluated. The evaluation results are described in Table 1.

Example 6

Production of an Electrode Material

Lithium acetate (LiCH$_3$COO, 4 mol), iron (II) sulfate (FeSO$_4$, 2 mol) and phosphoric acid (H$_3$PO$_4$, 2 mol) were mixed with water (2 L) so that the total amount became 4 L, thereby preparing a homogeneous slurry-form mixture.

Next, the mixture was accommodated in a pressure-resistant closed container having a capacity of 8 L, and was hydrothermally synthesized at 160° C. for 3 hours.

Next, the obtained segment was washed using water, thereby obtaining a cake-form precursor of electrode active material particles.

Next, the precursor of the electrode active material particles (150 g in terms of the solid solution) and, as an organic compound, an aqueous solution of polyvinyl alcohol obtained by dissolving polyvinyl alcohol (PVA, 2.7 g) in water (100 g) were mixed so as to produce a slurry, and a dispersion treatment was carried out on the slurry using a two-fluid wet jet crusher so that D50 became 84 nm in the grain size distribution of the precursor of the electrode active material particles in the slurry.

Next, the slurry that had been subjected to the dispersion treatment was sprayed in the atmosphere at 180° C. and was dried, thereby obtaining a dried substance having an average particle diameter of 6 μm.

Next, the obtained dried substance was fired at 700° C. in a nitrogen atmosphere for 1 hour, thereby obtaining an agglomerate B1 which was formed by agglomerating first carbonaceous coated electrode active material particles and had an average particle diameter of 6 μm.

Meanwhile, the precursor of the electrode active material particles (150 g in terms of the solid solution) and, as an organic compound, an aqueous solution of polyvinyl alcohol obtained by dissolving polyvinyl alcohol (PVA, 6.6 g) in water (100 g) were mixed so as to produce a slurry, and a dispersion treatment was carried out on the slurry using a two-fluid wet jet crusher so that D50 became 84 nm in the grain size distribution of the precursor of the electrode active material particles in the slurry.

Next, the slurry that had been subjected to the dispersion treatment was sprayed in the atmosphere at 180° C. and was dried, thereby obtaining a dried substance having an average particle diameter of 6 μm.

Next, the obtained dried substance was fired at 700° C. in a nitrogen atmosphere for 1 hour, thereby obtaining an agglomerate B2 which was formed by agglomerating second carbonaceous coated electrode active material particles and had an average particle diameter of 6 μm.

Next, the agglomerate B1 and the agglomerate B2 were mixed so that the ratio M2/(M1+M2) of the volume M2 of the agglomerate B2 to the total volume of the volume M1 of the agglomerate B1 and the volume M2 of the agglomerate 132 became 0.25, thereby obtaining an electrode material of Example 6 containing the agglomerate B1 and the agglomerate B2 mixed therein.

Next, the electrode material was evaluated in the same manner as in Example 1.

In addition, a lithium ion battery of Example 6 was produced in the same manner as in Example 1 using the electrode material, and was evaluated. The evaluation results are described in Table 1.

Example 7

The agglomerate B1 and the agglomerate B2 which had been obtained in Example 6 were mixed so that the ratio M2/(M1+M2) became 0.40, thereby producing an electrode material of Example 7 containing the agglomerate B1 and the agglomerate B2 mixed therein, and the electrode material was evaluated in the same manner as in Example 1.

In addition, a lithium ion battery of Example 7 was produced in the same manner as in Example 1 using the electrode material, and was evaluated. The evaluation results are described in Table 1.

Example 8

The agglomerate B1 and the agglomerate B2 which had been obtained in Example 6 were mixed so that the ratio M2/(M1+M2) became 0.55, thereby producing an electrode material of Example 8 containing the agglomerate B1 and the agglomerate B2 mixed therein, and the electrode material was evaluated in the same manner as in Example 1.

In addition, a lithium ion battery of Example 8 was produced in the same manner as in Example 1 using the electrode material, and was evaluated. The evaluation results are described in Table 1.

Example 9

The agglomerate B1 and the agglomerate B2 which had been obtained in Example 6 were mixed so that the ratio M2/(M1+M2) became 0.75, thereby producing an electrode material of Example 9 containing the agglomerate B1 and the agglomerate B2 mixed therein, and the electrode material was evaluated in the same manner as in Example 1.

In addition, a lithium ion battery of Example 9 was produced in the same manner as in Example 1 using the electrode material, and was evaluated. The evaluation results are described in Table 1.

Example 10

The agglomerate B1 and the agglomerate B2 which had been obtained in Example 6 were mixed so that the ratio M2/(M1+M2) became 0.95, thereby producing an electrode material of Example 10 containing the agglomerate B1 and the agglomerate B2 mixed therein, and the electrode material was evaluated in the same manner as in Example 1.

In addition, a lithium ion battery of Example 10 was produced in the same manner as in Example 1 using the electrode material, and was evaluated. The evaluation results are described in Table 1.

Example 11

Production of an Electrode Material

Lithium acetate (LiCH$_3$COO, 4 mol), iron (II) sulfate (FeSO$_4$, 2 mol) and phosphoric acid (H$_3$PO$_4$, 2 mol) were mixed with water (2 L) so that the total amount became 4 L, thereby preparing a homogeneous slurry-form mixture.

Next, the mixture was accommodated in a pressure-resistant closed container having a capacity of 8 L, and was hydrothermally synthesized at 140° C. for 6 hours.

Next, the obtained segment was washed using water, thereby obtaining a cake-form precursor of electrode active material particles.

Next, the precursor of the electrode active material particles (150 g in terms of the solid solution) and, as an organic compound, an aqueous solution of polyvinyl alcohol obtained by dissolving polyvinyl alcohol (PVA, 4.3 g) in water (100 g) were mixed so as to produce a slurry, and a dispersion treatment was carried out on the slurry using a two-fluid wet jet crusher so that D50 became 53 nm in the grain size distribution of the precursor of the electrode active material particles in the slurry.

Next, the slurry that had been subjected to the dispersion treatment was sprayed in the atmosphere at 180° C. and was dried, thereby obtaining a dried substance having an average particle diameter of 6 μm.

Next, the obtained dried substance was fired at 700° C. in a nitrogen atmosphere for 1 hour, thereby obtaining an agglomerate C1 which was formed by agglomerating first carbonaceous coated electrode active material particles and had an average particle diameter of 6 μm.

Meanwhile, the precursor of the electrode active material particles (150 g in terms of the solid solution) and, as an organic compound, an aqueous solution of polyvinyl alcohol obtained by dissolving polyvinyl alcohol (PVA, 11.8 g) in water (100 g) were mixed so as to produce a slurry, and a dispersion treatment was carried out on the slurry using a two-fluid wet jet crusher so that D50 became 53 nm in the grain size distribution of the precursor of the electrode active material particles in the slurry.

Next, the slurry that had been subjected to the dispersion treatment was sprayed in the atmosphere at 180° C. and was dried, thereby obtaining a dried substance having an average particle diameter of 6 μm.

Next, the obtained dried substance was fired at 700° C. in a nitrogen atmosphere for 1 hour, thereby obtaining an agglomerate C2 which was formed by agglomerating second carbonaceous coated electrode active material particles and had an average particle diameter of 6 μm.

Next, the agglomerate C1 and the agglomerate C2 were mixed so that the ratio M2/(M1+M2) of the volume M2 of the agglomerate C2 to the total volume of the volume M1 of the agglomerate C1 and the volume M2 of the agglomerate C2 became 0.25, thereby obtaining an electrode material of Example 11 containing the agglomerate C1 and the agglomerate C2 mixed therein.

Next, the electrode material was evaluated in the same manner as in Example 1.

In addition, a lithium ion battery of Example 11 was produced in the same manner as in Example 1 using the electrode material, and was evaluated. The evaluation results are described in Table 1.

Example 12

The agglomerate C1 and the agglomerate C2 which had been obtained in Example 11 were mixed so that the ratio M2/(M1+M2) became 0.40, thereby producing an electrode material of Example 12 containing the agglomerate C1 and the agglomerate C2 mixed therein, and the electrode material was evaluated in the same manner as in Example 1.

In addition, a lithium ion battery of Example 12 was produced in the same manner as in Example 1 using the electrode material, and was evaluated. The evaluation results are described in Table 1.

Example 13

The agglomerate C1 and the agglomerate C2 which had been obtained in Example 11 were mixed so that the ratio M2/(M1+M2) became 0.55, thereby producing an electrode material of Example 13 containing the agglomerate C1 and the agglomerate C2 mixed therein, and the electrode material was evaluated in the same manner as in Example 1.

In addition, a lithium ion battery of Example 13 was produced in the same manner as in Example 1 using the electrode material, and was evaluated. The evaluation results are described in Table 1.

Example 14

The agglomerate C1 and the agglomerate C2 which had been obtained in Example 11 were mixed so that the ratio M2/(M1+M2) became 0.75, thereby producing an electrode material of Example 14 containing the agglomerate C1 and the agglomerate C2 mixed therein, and the electrode material was evaluated in the same manner as in Example 1.

In addition, a lithium ion battery of Example 14 was produced in the same manner as in Example 1 using the electrode material, and was evaluated. The evaluation results are described in Table 1.

Example 15

The agglomerate C1 and the agglomerate C2 which had been obtained in Example 11 were mixed so that the ratio M2/(M1+M2) became 0.95, thereby producing an electrode material of Example 15 containing the agglomerate C1 and the agglomerate C2 mixed therein, and the electrode material was evaluated in the same manner as in Example 1.

In addition, a lithium ion battery of Example 15 was produced in the same manner as in Example 1 using the electrode material, and was evaluated. The evaluation results are described in Table 1.

Example 16

Production of an Electrode Material

Lithium acetate ($LiCH_3COO$, 4 mol), iron (II) sulfate ($FeSO_4$, 2 mol) and phosphoric acid ($H_3PO_4$, 2 mol) were mixed with water (2 L) so that the total amount became 4 L, thereby preparing a homogeneous slurry-form mixture.

Next, the mixture was accommodated in a pressure-resistant closed container having a capacity of 8 L, and was hydrothermally synthesized at 120° C. for 9 hours.

Next, the obtained segment was washed using water, thereby obtaining a cake-form precursor of electrode active material particles.

Next, the precursor of the electrode active material particles (150 g in terms of the solid solution) and, as an organic compound, an aqueous solution of polyvinyl alcohol obtained by dissolving polyvinyl alcohol (PVA, 5.4 g) in water (100 g) were mixed so as to produce a slurry, and a dispersion treatment was carried out on the slurry using a two-fluid wet jet crusher so that D50 became 44 nm in the grain size distribution of the precursor of the electrode active material particles in the slurry.

Next, the slurry that had been subjected to the dispersion treatment was sprayed in the atmosphere at 180° C. and was dried, thereby obtaining a dried substance having an average particle diameter of 6 µm.

Next, the obtained dried substance was fired at 700° C. in a nitrogen atmosphere for 1 hour, thereby obtaining an agglomerate D1 which was formed by agglomerating first carbonaceous coated electrode active material particles and had an average particle diameter of 6 µm.

Meanwhile, the precursor of the electrode active material particles (150 g in terms of the solid solution) and, as an organic compound, an aqueous solution of polyvinyl alcohol obtained by dissolving polyvinyl alcohol (PVA, 11.8 g) in water (100 g) were mixed so as to produce a slurry, and a dispersion treatment was carried out on the slurry using a two-fluid wet jet crusher so that D50 became 44 nm in the grain size distribution of the precursor of the electrode active material particles in the slurry.

Next, the slurry that had been subjected to the dispersion treatment was sprayed in the atmosphere at 180° C. and was dried, thereby obtaining a dried substance having an average particle diameter of 6 µm.

Next, the obtained dried substance was fired at 700° C. in a nitrogen atmosphere for 1 hour, thereby obtaining an agglomerate D2 which was formed by agglomerating second carbonaceous coated electrode active material particles and had an average particle diameter of 6 µm.

Next, the agglomerate D1 and the agglomerate D2 were mixed so that the ratio M2/(M1+M2) of the volume M2 of the agglomerate D2 to the total volume of the volume M1 of the agglomerate D1 and the volume M2 of the agglomerate D2 became 0.25, thereby obtaining an electrode material of Example 16 containing the agglomerate D1 and the agglomerate D2 mixed therein.

Next, the electrode material was evaluated in the same manner as in Example 1.

In addition, a lithium ion battery of Example 16 was produced in the same manner as in Example 1 using the electrode material, and was evaluated. The evaluation results are described in Table 1.

Example 17

The agglomerate D1 and the agglomerate D2 which had been obtained in Example 16 were mixed so that the ratio M2/(M1+M2) became 0.40, thereby producing an electrode material of Example 17 containing the agglomerate D1 and the agglomerate D2 mixed therein, and the electrode material was evaluated in the same manner as in Example 1.

In addition, a lithium ion battery of Example 17 was produced in the same manner as in Example 1 using the electrode material, and was evaluated. The evaluation results are described in Table 1.

Example 18

The agglomerate D1 and the agglomerate D2 which had been obtained in Example 16 were mixed so that the ratio M2/(M1+M2) became 0.55, thereby producing an electrode material of Example 18 containing the agglomerate D1 and the agglomerate D2 mixed therein, and the electrode material was evaluated in the same manner as in Example 1.

In addition, a lithium ion battery of Example 18 was produced in the same manner as in Example 1 using the electrode material, and was evaluated. The evaluation results are described in Table 1.

Example 19

The agglomerate D1 and the agglomerate D2 which had been obtained in Example 16 were mixed so that the ratio M2/(M1+M2) became 0.75, thereby producing an electrode material of Example 19 containing the agglomerate D1 and the agglomerate D2 mixed therein, and the electrode material was evaluated in the same manner as in Example 1.

In addition, a lithium ion battery of Example 19 was produced in the same manner as in Example 1 using the electrode material, and was evaluated. The evaluation results are described in Table 1.

Example 20

The agglomerate D1 and the agglomerate D2 which had been obtained in Example 16 were mixed so that the ratio M2/(M1+M2) became 0.95, thereby producing an electrode material of Example 20 containing the agglomerate D1 and the agglomerate D2 mixed therein, and the electrode material was evaluated in the same manner as in Example 1.

In addition, a lithium ion battery of Example 20 was produced in the same manner as in Example 1 using the electrode material, and was evaluated. The evaluation results are described in Table 1.

Example 21

Production of an Electrode Material

Lithium acetate ($LiCH_3COO$, 4 mol), iron (II) sulfate ($FeSO_4$, 2 mol) and phosphoric acid ($H_3PO_4$, 2 mol) were mixed with water (2 L) so that the total amount became 4 L, thereby preparing a homogeneous slurry-form mixture.

Next, the mixture was accommodated in a pressure-resistant closed container having a capacity of 8 L, and was hydrothermally synthesized at 140° C. for 6 hours.

Next, the obtained segment was washed using water, thereby obtaining a cake-form precursor of electrode active material particles.

Next, the precursor of the electrode active material particles (150 g in terms of the solid solution) and, as an organic compound, an aqueous solution of polyvinyl alcohol obtained by dissolving polyvinyl alcohol (PVA, 3.7 g) in water (100 g) were mixed so as to produce a slurry, and a dispersion treatment was carried out on the slurry using a two-fluid wet jet crusher so that D50 became 49 nm in the grain size distribution of the precursor of the electrode active material particles in the slurry.

Next, the slurry that had been subjected to the dispersion treatment was sprayed in the atmosphere at 180° C. and was dried, thereby obtaining a dried substance having an average particle diameter of 6 μm.

Next, the obtained dried substance was fired at 700° C. in a nitrogen atmosphere for 1 hour, thereby obtaining an agglomerate E1 which was formed by agglomerating first carbonaceous coated electrode active material particles and had an average particle diameter of 6 μm.

Meanwhile, the precursor of the electrode active material particles (150 g in terms of the solid solution) and, as an organic compound, an aqueous solution of polyvinyl alcohol obtained by dissolving polyvinyl alcohol (PVA, 7.4 g) in water (100 g) were mixed so as to produce a slurry, and a dispersion treatment was carried out on the slurry using a two-fluid wet jet crusher so that D50 became 49 nm in the grain size distribution of the precursor of the electrode active material particles in the slurry.

Next, the slurry that had been subjected to the dispersion treatment was sprayed in the atmosphere at 180° C. and was dried, thereby obtaining a dried substance having an average particle diameter of 6 μm.

Next, the obtained dried substance was fired at 700° C. in a nitrogen atmosphere for 1 hour, thereby obtaining an agglomerate E2 which was formed by agglomerating second carbonaceous coated electrode active material particles and had an average particle diameter of 6 μm.

Next, the agglomerate E1 and the agglomerate E2 were mixed so that the ratio M2/(M1+M2) of the volume M2 of the agglomerate E2 to the total volume of the volume M1 of the agglomerate E1 and the volume M2 of the agglomerate E2 became 0.75, thereby obtaining an electrode material of Example 21 containing the agglomerate E1 and the agglomerate E2 mixed therein.

Next, the electrode material was evaluated in the same manner as in Example 1.

In addition, a lithium ion battery of Example 21 was produced in the same manner as in Example 1 using the electrode material, and was evaluated. The evaluation results are described in Table 1.

Example 22

Production of an Electrode Material

Lithium acetate ($LiCH_3COO$, 4 mol), iron (II) sulfate ($FeSO_4$, 2 mol) and phosphoric acid ($H_3PO_4$, 2 mol) were mixed with water (2 L) so that the total amount became 4 L, thereby preparing a homogeneous slurry-form mixture.

Next, the mixture was accommodated in a pressure-resistant closed container having a capacity of 8 L, and was hydrothermally synthesized at 140° C. for 6 hours.

Next, the obtained segment was washed using water, thereby obtaining a cake-form precursor of electrode active material particles.

Next, the precursor of the electrode active material particles (150 g in terms of the solid solution) and, as an organic compound, an aqueous solution of polyvinyl alcohol obtained by dissolving polyvinyl alcohol (PVA, 3.1 g) in water (100 g) were mixed so as to produce a slurry, and a dispersion treatment was carried out on the slurry using a two-fluid wet jet crusher so that D50 became 56 nm in the grain size distribution of the precursor of the electrode active material particles in the slurry.

Next, the slurry that had been subjected to the dispersion treatment was sprayed in the atmosphere at 180° C. and was dried, thereby obtaining a dried substance having an average particle diameter of 6 μm.

Next, the obtained dried substance was fired at 700° C. in a nitrogen atmosphere for 1 hour, thereby obtaining an agglomerate F1 which was formed by agglomerating first carbonaceous coated electrode active material particles and had an average particle diameter of 6 μm.

Meanwhile, the precursor of the electrode active material particles (150 g in terms of the solid solution) and, as an organic compound, an aqueous solution of polyvinyl alcohol obtained by dissolving polyvinyl alcohol (PVA, 6.3 g) in water (100 g) were mixed so as to produce a slurry, and a dispersion treatment was carried out on the slurry using a two-fluid wet jet crusher so that D50 became 56 nm in the grain size distribution of the precursor of the electrode active material particles in the slurry.

Next, the slurry that had been subjected to the dispersion treatment was sprayed in the atmosphere at 180° C. and was dried, thereby obtaining a dried substance having an average particle diameter of 6 μm.

Next, the obtained dried substance was fired at 700° C. in a nitrogen atmosphere for 1 hour, thereby obtaining an agglomerate F2 which was formed by agglomerating second carbonaceous coated electrode active material particles and had an average particle diameter of 6 μm.

Next, the agglomerate F1 and the agglomerate F2 were mixed so that the ratio M2/(M1+M2) of the volume M2 of the agglomerate F2 to the total volume of the volume M1 of the agglomerate F1 and the volume M2 of the agglomerate F2 became 0.75, thereby obtaining an electrode material of Example 22 containing the agglomerate F1 and the agglomerate F2 mixed therein.

Next, the electrode material was evaluated in the same manner as in Example 1.

In addition, a lithium ion battery of Example 22 was produced in the same manner as in Example 1 using the electrode material, and was evaluated. The evaluation results are described in Table 1.

Example 23

Production of an Electrode Material

Lithium acetate ($LiCH_3COO$, 4 mol), iron (II) sulfate ($FeSO_4$, 2 mol) and phosphoric acid ($H_3PO_4$, 2 mol) were mixed with water (2 L) so that the total amount became 4 L, thereby preparing a homogeneous slurry-form mixture.

Next, the mixture was accommodated in a pressure-resistant closed container having a capacity of 8 L, and was hydrothermally synthesized at 140° C. for 6 hours.

Next, the obtained segment was washed using water, thereby obtaining a cake-form precursor of electrode active material particles.

Next, the precursor of the electrode active material particles (150 g in terms of the solid solution) and, as an organic compound, an aqueous solution of polyvinyl alcohol obtained by dissolving polyvinyl alcohol (PVA, 2.5 g) in water (100 g) were mixed so as to produce a slurry, and a dispersion treatment was carried out on the slurry using a two-fluid wet jet crusher so that D50 became 56 nm in the grain size distribution of the precursor of the electrode active material particles in the slurry, thereby obtaining a dispersed slurry G1.

Meanwhile, lithium acetate ($LiCH_3COO$, 4 mol), iron (II) sulfate ($FeSO_4$, 2 mol) and phosphoric acid ($H_3PO_4$, 2 mol) were mixed with water (2 L) so that the total amount became 4 L, thereby preparing a homogeneous slurry-form mixture.

Next, the mixture was accommodated in a pressure-resistant closed container having a capacity of 8 L, and was hydrothermally synthesized at 200° C. for 1 hour.

Next, the obtained segment was washed using water, thereby obtaining a cake-form precursor of electrode active material particles.

Next, the precursor of the electrode active material particles (150 g in terms of the solid solution) and, as an organic compound, an aqueous solution of polyvinyl alcohol obtained by dissolving polyvinyl alcohol (PVA, 3.1 g) in water (100 g) were mixed so as to produce a slurry, and a dispersion treatment was carried out on the slurry using a two-fluid wet jet crusher so that D50 became 140 nm in the grain size distribution of the precursor of the electrode active material particles in the slurry, thereby obtaining a dispersed slurry G2.

Next, the dispersed slurry G1 and the dispersed slurry G2 were mixed so that the ratio N2/(N1+N2) of the volume N2 of the solid content (second carbonaceous coated electrode active material particles) in the dispersed slurry G2 to the total volume of the volume N1 of the solid content (first carbonaceous coated electrode active material particles) in the dispersed slurry G1 and the volume N2 of the solid content (second carbonaceous coated electrode active material particles) in the dispersed slurry G2 became 0.25.

Next, the slurry was sprayed in the atmosphere at 180° C. and was dried, thereby obtaining a dried substance having an average particle diameter of 6 μm.

Next, the obtained dried substance was fired at 700° C. in a nitrogen atmosphere for 1 hour, thereby obtaining an electrode material of Example 23 that was an agglomerate which had been formed by agglomerating the first carbonaceous coated electrode active material particles and the second carbonaceous coated electrode active material particles and had an average particle diameter of 6 μm.

Next, the electrode material was evaluated in the same manner as in Example 1.

In addition, a lithium ion battery of Example 23 was produced in the same manner as in Example 1 using the electrode material, and was evaluated. The evaluation results are described in Table 1.

Example 24

The dispersed slurry G1 and the dispersed slurry G2 which had been obtained in Example 23 were mixed so that the ratio N2/(N1+N2) became 0.50, the obtained slurry was sprayed in the atmosphere at 180° C. and was dried, thereby obtaining a dried substance having an average particle diameter of 6 μm.

Next, the obtained dried substance was fired at 700° C. in a nitrogen atmosphere for 1 hour, thereby obtaining an electrode material of Example 24 that was an agglomerate which had been formed by agglomerating the first carbonaceous coated electrode active material particles and the second carbonaceous coated electrode active material particles and had an average particle diameter of 6 μm.

Next, the electrode material was evaluated in the same manner as in Example 1.

In addition, a lithium ion battery of Example 24 was produced in the same manner as in Example 1 using the electrode material, and was evaluated. The evaluation results are described in Table 1.

Example 25

The dispersed slurry G1 and the dispersed slurry G2 which had been obtained in Example 23 were mixed so that the ratio N2/(N1+N2) became 0.75, the obtained slurry was sprayed in the atmosphere at 180° C. and was dried, thereby obtaining a dried substance having an average particle diameter of 6 μm.

Next, the obtained dried substance was fired at 700° C. in a nitrogen atmosphere for 1 hour, thereby obtaining an electrode material of Example 25 that was an agglomerate which had been formed by agglomerating the first carbonaceous coated electrode active material particles and the second carbonaceous coated electrode active material particles and had an average particle diameter of 6 μm.

Next, the electrode material was evaluated in the same manner as in Example 1.

In addition, a lithium ion battery of Example 25 was produced in the same manner as in Example 1 using the electrode material, and was evaluated. The evaluation results are described in Table 1.

Comparative Example 1

Production of an Electrode Material

Lithium acetate ($LiCH_3COO$, 4 mol), iron (II) sulfate ($FeSO_4$, 2 mol) and phosphoric acid ($H_3PO_4$, 2 mol) were mixed with water (2 L) so that the total amount became 4 L, thereby preparing a homogeneous slurry-form mixture.

Next, the mixture was accommodated in a pressure-resistant closed container having a capacity of 8 L, and was hydrothermally synthesized at 200° C. for 9 hours.

Next, the obtained segment was washed using water, thereby obtaining a cake-form precursor of electrode active material particles.

Next, the precursor of the electrode active material particles (150 g in terms of the solid solution) and, as an organic compound, an aqueous solution of polyvinyl alcohol obtained by dissolving polyvinyl alcohol (PVA, 0.8 g) in water (100 g) were mixed so as to produce a slurry, and a dispersion treatment was carried out on the slurry using a two-fluid wet jet crusher so that D50 became 250 nm in the grain size distribution of the precursor of the electrode active material particles in the slurry.

Next, the slurry that had been subjected to the dispersion treatment was sprayed in the atmosphere at 180° C. and was dried, thereby obtaining a dried substance having an average particle diameter of 6 μm.

Next, the obtained dried substance was fired at 700° C. in a nitrogen atmosphere for 1 hour, thereby obtaining an agglomerate H1 which had been formed by agglomerating the first carbonaceous coated electrode active material particles and had an average particle diameter of 6 μm.

Meanwhile, the precursor of the electrode active material particles (150 g in terms of the solid solution) and, as an organic compound, an aqueous solution of polyvinyl alcohol obtained by dissolving polyvinyl alcohol (PVA, 2.3 g) in water (100 g) were mixed so as to produce a slurry, and a dispersion treatment was carried out on the slurry using a two-fluid wet jet crusher so that D50 became 250 nm in the grain size distribution of the precursor of the electrode active material particles in the slurry.

Next, the slurry that had been subjected to the dispersion treatment was sprayed in the atmosphere at 180° C. and was dried, thereby obtaining a dried substance having an average particle diameter of 6 μm.

Next, the obtained dried substance was fired at 700° C. in a nitrogen atmosphere for 1 hour, thereby obtaining an agglomerate H2 which was formed by agglomerating second carbonaceous coated electrode active material particles and had an average particle diameter of 6 μm.

Next, the agglomerate H1 and the agglomerate H2 were mixed so that the ratio M2/(M1+M2) of the volume M2 of the agglomerate H2 to the total volume of the volume M1 of the agglomerate H1 and the volume M2 of the agglomerate H2 became 0.25, thereby obtaining an electrode material of Comparative Example 1 containing the agglomerate H1 and the agglomerate H2 mixed therein.

Next, the electrode material was evaluated in the same manner as in Example 1.

In addition, a lithium ion battery of Comparative Example 1 was produced in the same manner as in Example 1 using the electrode material, and was evaluated. The evaluation results are described in Table 1.

Comparative Example 2

The agglomerate H1 and the agglomerate H2 which had been obtained in Comparative Example 1 were mixed so that the ratio M2/(M1+M2) became 0.55, thereby producing an electrode material of Comparative Example 2 containing the agglomerate H1 and the agglomerate H2 mixed therein, and the electrode material was evaluated in the same manner as in Example 1.

In addition, a lithium ion battery of Comparative Example 2 was produced in the same manner as in Example 1 using the electrode material, and was evaluated. The evaluation results are described in Table 1.

Comparative Example 3

The agglomerate H1 and the agglomerate H2 which had been obtained in Comparative Example 1 were mixed so that the ratio M2/(M1+M2) became 0.95, thereby producing an electrode material of Comparative Example 3 containing the agglomerate H1 and the agglomerate H2 mixed therein, and the electrode material was evaluated in the same manner as in Example 1.

In addition, a lithium ion battery of Comparative Example 3 was produced in the same manner as in Example 1 using the electrode material, and was evaluated. The evaluation results are described in Table 1.

Comparative Example 4

Production of an Electrode Material

Lithium acetate ($LiCH_3COO$, 4 mol), iron (II) sulfate ($FeSO_4$, 2 mol) and phosphoric acid ($H_3PO_4$, 2 mol) were mixed with water (2 L) so that the total amount became 4 L, thereby preparing a homogeneous slurry-form mixture.

Next, the mixture was accommodated in a pressure-resistant closed container having a capacity of 8 L, and was hydrothermally synthesized at 120° C. for 9 hours.

Next, the obtained segment was washed using water, thereby obtaining a cake-form precursor of electrode active material particles.

Next, the precursor of the electrode active material particles (150 g in terms of the solid solution) and, as an organic compound, an aqueous solution of polyvinyl alcohol obtained by dissolving polyvinyl alcohol (PVA, 17.8 g) in water (100 g) were mixed so as to produce a slurry, and a dispersion treatment was carried out on the slurry using a two-fluid wet jet crusher so that D50 became 38 nm in the grain size distribution of the precursor of the electrode active material particles in the slurry.

Next, the slurry that had been subjected to the dispersion treatment was sprayed in the atmosphere at 180° C. and was dried, thereby obtaining a dried substance having an average particle diameter of 6 μm.

Next, the obtained dried substance was fired at 700° C. in a nitrogen atmosphere for 1 hour, thereby obtaining an agglomerate J1 which had been formed by agglomerating the first carbonaceous coated electrode active material particles and had an average particle diameter of 6 μm.

Meanwhile, the precursor of the electrode active material particles (150 g in terms of the solid solution) and, as an organic compound, an aqueous solution of polyvinyl alcohol obtained by dissolving polyvinyl alcohol (PVA, 53.5 g) in water (100 g) were mixed so as to produce a slurry, and a dispersion treatment was carried out on the slurry using a two-fluid wet jet crusher so that D50 became 38 nm in the grain size distribution of the precursor of the electrode active material particles in the slurry.

Next, the slurry that had been subjected to the dispersion treatment was sprayed in the atmosphere at 180° C. and was dried, thereby obtaining a dried substance having an average particle diameter of 6 μm.

Next, the obtained dried substance was fired at 700° C. in a nitrogen atmosphere for 1 hour, thereby obtaining an agglomerate J2 which was formed by agglomerating second carbonaceous coated electrode active material particles and had an average particle diameter of 6 μm.

Next, the agglomerate J1 and the agglomerate J2 were mixed so that the ratio M2/(M1+M2) of the volume M2 of the agglomerate J2 to the total volume of the volume M1 of the agglomerate J1 and the volume M2 of the agglomerate J2 became 0.25, thereby obtaining an electrode material of Comparative Example 4 containing the agglomerate J1 and the agglomerate J2 mixed therein.

Next, the electrode material was evaluated in the same manner as in Example 1.

In addition, a lithium ion battery of Comparative Example 4 was produced in the same manner as in Example 1 using the electrode material, and was evaluated. The evaluation results are described in Table 1.

Comparative Example 5

A precursor of cake-form electrode active material particles was obtained in the same manner as in Comparative Example 4.

Next, the precursor of the electrode active material particles (150 g in terms of the solid solution) and, as an organic compound, an aqueous solution of polyvinyl alcohol obtained by dissolving polyvinyl alcohol (PVA, 63.5 g) in water (100 g) were mixed so as to produce a slurry, and a dispersion treatment was carried out on the slurry using a two-fluid wet jet crusher so that D50 became 38 nm in the grain size distribution of the precursor of the electrode active material particles in the slurry.

Next, the slurry that had been subjected to the dispersion treatment was sprayed in the atmosphere at 180° C. and was dried, thereby obtaining a dried substance having an average particle diameter of 6 μm.

Next, the obtained dried substance was fired at 700° C. in a nitrogen atmosphere for 1 hour, thereby obtaining an agglomerate K1 which was formed by agglomerating first carbonaceous coated electrode active material particles and had an average particle diameter of 6 μm.

Next, the agglomerate J1 which had been obtained in the same manner as in Comparative Example 4 and the agglomerate K1 were mixed so that the ratio M2/(M1+M2) of the volume M2 of the agglomerate K1 to the total volume of the volume M1 of the agglomerate J1 and the volume M2 of the agglomerate K1 became 0.55, thereby obtaining an electrode material of Comparative Example 5 containing the agglomerate J1 and the agglomerate K1 mixed therein.

Next, the electrode material was evaluated in the same manner as in Example 1.

In addition, a lithium ion battery of Comparative Example 5 was produced in the same manner as in Example 1 using the electrode material, and was evaluated. The evaluation results are described in Table 1.

Comparative Example 6

A precursor of cake-form electrode active material particles was obtained in the same manner as in Comparative Example 4.

Next, the precursor of the electrode active material particles (150 g in terms of the solid solution) and, as an organic compound, an aqueous solution of polyvinyl alcohol obtained by dissolving polyvinyl alcohol (PVA, 89.1 g) in water (100 g) were mixed so as to produce a slurry, and a dispersion treatment was carried out on the slurry using a two-fluid wet jet crusher so that D50 became 38 nm in the grain size distribution of the precursor of the electrode active material particles in the slurry.

Next, the slurry that had been subjected to the dispersion treatment was sprayed in the atmosphere at 180° C. and was dried, thereby obtaining a dried substance having an average particle diameter of 6 μm.

Next, the obtained dried substance was fired at 700° C. in a nitrogen atmosphere for 1 hour, thereby obtaining an agglomerate L1 which was formed by agglomerating first carbonaceous coated electrode active material particles and had an average particle diameter of 6 μm.

Next, the agglomerate J1 which had been obtained in the same manner as in Comparative Example 4 and the agglomerate L1 were mixed so that the ratio M2/(M1+M2) of the volume M2 of the agglomerate L1 to the total volume of the volume M1 of the agglomerate J1 and the volume M2 of the agglomerate L1 became 0.95, thereby obtaining an electrode material of Comparative Example 6 containing the agglomerate J1 and the agglomerate L1 mixed therein.

Next, the electrode material was evaluated in the same manner as in Example 1.

In addition, a lithium ion battery of Comparative Example 6 was produced in the same manner as in Example 1 using the electrode material, and was evaluated. The evaluation results are described in Table 1.

Comparative Example 7

Production of an Electrode Material

Lithium acetate ($LiCH_3COO$, 4 mol), iron (II) sulfate ($FeSO_4$, 2 mol) and phosphoric acid ($H_3PO_4$, 2 mol) were mixed with water (2 L) so that the total amount became 4 L, thereby preparing a homogeneous slurry-form mixture.

Next, the mixture was accommodated in a pressure-resistant closed container having a capacity of 8 L, and was hydrothermally synthesized at 160° C. for 3 hours.

Next, the obtained segment was washed using water, thereby obtaining a cake-form precursor of electrode active material particles.

Next, the precursor of the electrode active material particles (150 g in terms of the solid solution) and, as an organic compound, an aqueous solution of polyvinyl alcohol obtained by dissolving polyvinyl alcohol (PVA, 0.6 g) in water (100 g) were mixed so as to produce a slurry, and a dispersion treatment was carried out on the slurry using a two-fluid wet jet crusher so that D50 became 84 nm in the grain size distribution of the precursor of the electrode active material particles in the slurry.

Next, the slurry that had been subjected to the dispersion treatment was sprayed in the atmosphere at 180° C. and was dried, thereby obtaining a dried substance having an average particle diameter of 6 μm.

Next, the obtained dried substance was fired at 700° C. in a nitrogen atmosphere for 1 hour, thereby obtaining an agglomerate N1 which had been formed by agglomerating the first carbonaceous coated electrode active material particles and had an average particle diameter of 6 μm.

Meanwhile, the precursor of the electrode active material particles (150 g in terms of the solid solution) and, as an organic compound, an aqueous solution of polyvinyl alcohol obtained by dissolving polyvinyl alcohol (PVA, 1.8 g) in water (100 g) were mixed so as to produce a slurry, and a dispersion treatment was carried out on the slurry using a two-fluid wet jet crusher so that D50 became 84 nm in the grain size distribution of the precursor of the electrode active material particles in the slurry.

Next, the slurry that had been subjected to the dispersion treatment was sprayed in the atmosphere at 180° C. and was dried, thereby obtaining a dried substance having an average particle diameter of 6 μm.

Next, the obtained dried substance was fired at 700° C. in a nitrogen atmosphere for 1 hour, thereby obtaining an agglomerate N2 which was formed by agglomerating second carbonaceous coated electrode active material particles and had an average particle diameter of 6 μm.

Next, the agglomerate N1 and the agglomerate N2 were mixed so that the ratio M2/(M1+M2) of the volume M2 of the agglomerate N2 to the total volume of the volume M1 of the agglomerate N1 and the volume M2 of the agglomerate N2 became 0.75, thereby obtaining an electrode material of Comparative Example 7 containing the agglomerate N1 and the agglomerate N2 mixed therein.

Next, the electrode material was evaluated in the same manner as in Example 1.

In addition, a lithium ion battery of Comparative Example 7 was produced in the same manner as in Example 1 using the electrode material, and was evaluated. The evaluation results are described in Table 1.

Comparative Example 8

A precursor of cake-form electrode active material particles was obtained in the same manner as in Comparative Example 7.

Next, the precursor of the electrode active material particles (150 g in terms of the solid solution) and, as an organic compound, an aqueous solution of polyvinyl alcohol obtained by dissolving polyvinyl alcohol (PVA, 0.5 g) in water (100 g) were mixed so as to produce a slurry, and a dispersion treatment was carried out on the slurry using a two-fluid wet jet crusher so that D50 became 84 nm in the grain size distribution of the precursor of the electrode active material particles in the slurry.

Next, the slurry that had been subjected to the dispersion treatment was sprayed in the atmosphere at 180° C. and was dried, thereby obtaining a dried substance having an average particle diameter of 6 μm.

Next, the obtained dried substance was fired at 700° C. in a nitrogen atmosphere for 1 hour, thereby obtaining an agglomerate P1 which was formed by agglomerating first carbonaceous coated electrode active material particles and had an average particle diameter of 6 μm.

Meanwhile, the precursor of the electrode active material particles (150 g in terms of the solid solution) and, as an organic compound, an aqueous solution of polyvinyl alcohol obtained by dissolving polyvinyl alcohol (PVA, 1.7 g) in water (100 g) were mixed so as to produce a slurry, and a dispersion treatment was carried out on the slurry using a two-fluid wet jet crusher so that D50 became 84 nm in the grain size distribution of the precursor of the electrode active material particles in the slurry.

Next, the slurry that had been subjected to the dispersion treatment was sprayed in the atmosphere at 180° C. and was dried, thereby obtaining a dried substance having an average particle diameter of 6 μm.

Next, the obtained dried substance was fired at 700° C. in a nitrogen atmosphere for 1 hour, thereby obtaining an agglomerate P2 which was formed by agglomerating second carbonaceous coated electrode active material particles and had an average particle diameter of 6 μm.

Next, the agglomerate P1 and the agglomerate P2 were mixed so that the ratio M2/(M1+M2) of the volume M2 of the agglomerate P2 to the total volume of the volume M1 of the agglomerate P1 and the volume M2 of the agglomerate P2 became 0.95, thereby obtaining an electrode material of Comparative Example 8 containing the agglomerate P1 and the agglomerate P2 mixed therein.

Next, the electrode material was evaluated in the same manner as in Example 1.

In addition, a lithium ion battery of Comparative Example 8 was produced in the same manner as in Example 1 using the electrode material, and was evaluated. The evaluation results are described in Table 1.

TABLE 1

| | Specific surface area of electrode active material ($m^2/g$) | Ratio M2/(M1+M2) | Ratio N2/(N1+N2) | Average thickness of carbonaceous coat on first carbonaceous coated electrode active material particles (nm) | Average thickness of carbonaceous coat on second carbonaceous coated electrode active material particles (nm) | Amount of carbon (% by mass) | Coating rate of carbonaceous coat (%) | Internal resistance (Ω) |
|---|---|---|---|---|---|---|---|---|
| Example 1 | 6.3 | 0.25 | | 2.0 | 7.0 | 0.61 | >90 | 16.0 |
| Example 2 | 6.1 | 0.40 | | 1.8 | 6.0 | 0.64 | >90 | 14.8 |
| Example 3 | 6.2 | 0.55 | | 1.9 | 6.4 | 0.81 | >90 | 12.5 |
| Example 4 | 5.7 | 0.75 | | 1.6 | 6.6 | 0.91 | >90 | 11.5 |
| Example 5 | 5.9 | 0.95 | | 1.8 | 6.5 | 1.11 | >90 | 11.3 |
| Example 6 | 10.7 | 0.25 | | 1.6 | 3.8 | 0.68 | >90 | 9.6 |
| Example 7 | 10.6 | 0.40 | | 1.6 | 3.6 | 0.76 | >90 | 9.2 |
| Example 8 | 10.8 | 0.55 | | 1.4 | 3.3 | 0.79 | >90 | 9.5 |
| Example 9 | 10.5 | 0.75 | | 1.5 | 3.6 | 0.97 | >90 | 9.3 |
| Example 10 | 10.8 | 0.95 | | 1.4 | 3.8 | 1.19 | >90 | 9.8 |
| Example 11 | 16.8 | 0.25 | | 1.6 | 4.4 | 1.16 | >90 | 10.8 |
| Example 12 | 16.5 | 0.40 | | 1.5 | 3.8 | 1.20 | >90 | 11.2 |
| Example 13 | 16.6 | 0.55 | | 1.2 | 3.5 | 1.23 | >90 | 11.5 |
| Example 14 | 16.4 | 0.75 | | 1.3 | 4.0 | 1.64 | >90 | 12.4 |
| Example 15 | 16.8 | 0.95 | | 1.4 | 3.8 | 1.85 | >90 | 13.3 |
| Example 16 | 19.2 | 0.25 | | 1.2 | 3.0 | 0.95 | >90 | 10.2 |
| Example 17 | 19.1 | 0.40 | | 1.3 | 3.5 | 1.25 | >90 | 9.6 |
| Example 18 | 19.2 | 0.55 | | 1.6 | 4.4 | 1.81 | >90 | 9.3 |
| Example 19 | 19.3 | 0.75 | | 1.6 | 6.6 | 3.10 | >90 | 10.2 |
| Example 20 | 19.5 | 0.95 | | 1.8 | 6.8 | 3.83 | >90 | 14.2 |
| Example 21 | 17.2 | 0.75 | | 1.5 | 3.0 | 1.23 | 89 | 16.2 |
| Example 22 | 15.5 | 0.75 | | 1.5 | 3.0 | 1.04 | 83 | 15.8 |
| Example 23 | 12.8 | | 0.25 | 1.8 | 5.5 | 1.05 | >90 | 9.8 |

TABLE 1-continued

|  | Specific surface area of electrode active material ($m^2/g$) | Ratio M2/(M1 + M2) | Ratio N2/(N1 + N2) | Average thickness of carbonaceous coat on first carbonaceous coated electrode active material particles (nm) | Average thickness of carbonaceous coat on second carbonaceous coated electrode active material particles (nm) | Amount of carbon (% by mass) | Coating rate of carbonaceous coat (%) | Internal resistance ($\Omega$) |
|---|---|---|---|---|---|---|---|---|
| Example 24 | 10.6 |  | 0.50 | 1.7 | 5.6 | 1.16 | >90 | 9.3 |
| Example 25 | 8.5 |  | 0.75 | 1.8 | 5.4 | 1.15 | >90 | 9.5 |
| Comparative Example 1 | 3.5 | 0.25 |  | 4.2 | 0.5 | 0.22 | >90 | 21.2 |
| Comparative Example 2 | 3.7 | 0.55 |  | 4.1 | 10.5 | 0.32 | >90 | 28.3 |
| Comparative Example 3 | 3.4 | 0.95 |  | 4.3 | 12.3 | 0.40 | >90 | 37.2 |
| Comparative Example 4 | 22.0 | 0.25 |  | 4.5 | 15.0 | 4.95 | >90 | 27.6 |
| Comparative Example 5 | 21.8 | 0.55 |  | 4.2 | 18.0 | 7.95 | >90 | 24.6 |
| Comparative Example 6 | 22.0 | 0.95 |  | 5.0 | 25.0 | 15.84 | >90 | 21.3 |
| Comparative Example 7 | 10.2 | 0.75 |  | 4.1 | 0.5 | 0.29 | 74 | 35.5 |
| Comparative Example 8 | 10.8 | 0.95 |  | 4.2 | 0.5 | 0.32 | 68 | 40.2 |

According to the above-described results, it was found that the electrode materials of Examples 1 to 25 were made of an agglomerate formed by agglomerating carbonaceous coated electrode active material particles obtained by forming a carbonaceous coat on surfaces of electrode active material particles at a coating rate of 80% or more, the carbonaceous coated electrode active material particles include first carbonaceous coated electrode active material particles on which a carbonaceous coat having a film thickness in a range of 0.1 nm to 3.0 nm and an average film thickness in a range of 1.0 nm to 2.0 nm is formed and second carbonaceous coated electrode active material particles on which a carbonaceous coat having a film thickness in a range of 1.0 nm to 10.0 nm and an average film thickness in a range of more than 2.0 nm to 7.0 nm is formed, and, furthermore, the internal resistances were in a range of 9.2$\Omega$ to 16.2 $\Omega$.

In addition, it was found that, since the internal resistances were less than 20.0$\Omega$, the electrode materials had a low internal resistance compared to the electrode materials of Comparative Examples 1 to 8, and, in a case in which the electrode materials are used as an electrode material for lithium ion batteries, it is possible to decrease the internal resistance.

Since the electrode material of the invention is made of an agglomerate formed by agglomerating carbonaceous coated electrode active material particles obtained by forming a carbonaceous coat on surfaces of electrode active material particles at a coating rate of 80% or more, and the carbonaceous coated electrode active material particles include first carbonaceous coated electrode active material particles on which a carbonaceous coat having a film thickness in a range of 0.1 nm to 3.0 nm and an average film thickness in a range of 1.0 nm to 2.0 nm is formed and second carbonaceous coated electrode active material particles on which a carbonaceous coat having a film thickness in a range of 1.0 nm to 10.0 nm and an average film thickness in a range of more than 2.0 nm to 7.0 nm is formed, in particles having a thick carbonaceous coat, it is possible to increase the electron conductivity due to an increase in the amount of carbon, and, in particles having a thin carbonaceous coat, it is possible to decrease the ion transfer resistance of lithium ions due to a decrease in the diffusion distance of lithium ions in the carbonaceous film, whereby it is possible to improve the electron conductivity without impairing the conductivity of lithium ions. In addition, in a case in which the electrode material is used for lithium ion batteries, since it is possible to reduce the internal resistance of the batteries, and to apply the lithium ion batteries to high-output power supply use, it is also possible to apply the lithium ion batteries to next-generation secondary batteries that are expected to procure a decrease in size and weight and an increase in capacitance, and the effects are extremely large in next-generation secondary batteries.

What is claimed is:

1. An electrode material including an agglomerate formed by agglomerating carbonaceous coated electrode active material particles obtained by forming a carbonaceous coat on surfaces of electrode active material particles at a coating rate of 80% or more,
   wherein the carbonaceous coated electrode active material particles include first carbonaceous coated electrode active material particles on which a carbonaceous coat having a film thickness in a range of 0.1 nm to 3.0 nm and an average film thickness in a range of 1.0 nm to 2.0 nm is formed and second carbonaceous coated electrode active material particles on which a carbonaceous coat having a film thickness in a range of 1.0 nm to 10.0 nm and an average film thickness in a range of more than 2.0 nm to 7.0 nm is formed.

2. The electrode material according to claim 1,
   wherein the agglomerate includes a first agglomerate formed by agglomerating the first carbonaceous coated electrode active material particles and a second agglomerate formed by agglomerating the second carbonaceous coated electrode active material particles, and
   the first agglomerate and the second agglomerate are mixed so that a ratio M2/(M1+M2) of a volume M2 of the second agglomerate to a total volume of a volume M1 of the first agglomerate and the volume M2 of the second agglomerate becomes in a range of 0.25 to 0.95.

3. The electrode material according to claim 1,
   wherein the first carbonaceous coated electrode active material particle includes a thin film portion having a carbonaceous coat with a film thickness in a range of 0.1 nm to 0.5 nm and a thick film portion having a carbonaceous coat with a film thickness in a range of 1.0 nm to 3.0 nm formed on a surface of the same particle.

4. The electrode material according to claim 1,
wherein the agglomerate is formed by agglomerating in a state in which the first carbonaceous coated electrode active material particles and the second carbonaceous coated electrode active material particles are mixed so that a ratio N2/(N1+N2) of a volume N2 of the second carbonaceous coated electrode active material particles to a total volume of a volume N1 of the first carbonaceous coated electrode active material particles and the volume N2 of the second carbonaceous coated electrode active material particles becomes in a range of 0.25 to 0.95.

5. The electrode material according to claim 1,
wherein a mass of carbon in the carbonaceous coat is in a range of 0.6% by mass to 4.0% by mass of a mass of the electrode active material particles, and
a specific surface area of the electrode active material particles is in a range of 5 $m^2/g$ to 20 $m^2/g$.

6. An electrode including the electrode material according to claim 1.

7. A lithium ion battery including the electrode according to claim 6 as a cathode.

* * * * *